United States Patent [19]

Minegishi et al.

[11] 4,409,030
[45] Oct. 11, 1983

[54] MATERIAL FOR DESTROYING CONCRETE STRUCTURES

[75] Inventors: Keiichi Minegishi; Tokuji Akiba; Hiroshi Harada; Akihiko Takei; Motoshi Abe, all of Kumagaya, Japan

[73] Assignee: Chichibu Cement Co., Ltd., Tokyo, Japan

[21] Appl. No.: 346,120

[22] Filed: Feb. 5, 1982

[30] Foreign Application Priority Data

Feb. 6, 1981 [JP] Japan ................................... 56-15730

[51] Int. Cl.$^3$ .......................... C04B 31/02; C04B 7/35
[52] U.S. Cl. ...................................... 106/97; 106/104; 106/118
[58] Field of Search ........................... 106/97, 104, 118

[56] References Cited

U.S. PATENT DOCUMENTS

| | | | |
|---|---|---|---|
| 3,558,526 | 1/1971 | Hall | 106/118 |
| 3,801,339 | 4/1974 | Ogura et al. | 106/97 |
| 4,205,994 | 6/1980 | Moyer et al. | 106/118 |

*Primary Examiner*—James Poer
*Attorney, Agent, or Firm*—Birch, Stewart, Kolasch & Birch

[57] ABSTRACT

A material for destroying concrete structures, rock formations and the like comprises a mixture of 20 to 80 parts by weight of coarse-grained quicklime adjusted to a particle size of from 88 to 3000 microns, and 20 to 80 parts by weight of cement. The cement may contain calcium sulfoaluminate as a hydraulic component, and a retardant may be added to the mixture to retard the hydration of the calcium sulfoaluminate. The material is blended with water and then injected into holes formed in the body to be destroyed, the material expanding as it hydrates to crack and fracture the body.

14 Claims, 2 Drawing Figures

MATERIAL FOR DESTROYING CONCRETE STRUCTURES

BACKGROUND OF THE INVENTION

This invention relates to a material for destroying concrete structure and the like. More particularly, the invention relates to a material of the kind which is injected into a bore or cavity formed in a concrete structure or other body which is to be destroyed.

It has been conventional practice to disintegrate of fragment concrete structures by a method which relies upon an externally applied mechanical impact, or by a method based on the use of gunpowder. However, these methods raise problems in terms of public hazards and health as they involve great vibration and noise and pose a high level of danger for workers in the area. Thus there has been demand for the development of a novel method of destruction which is both safe and simple to carry out.

Several chemical methods of destruction have been proposed in recent years in an effort to meet such demand. According to these methods, concrete structures or the like are destroyed by boring a hole in the structure, sealing quicklime and water in the hole to induce a hydration reaction which gives rise to an approximate two-fold increase in volume, and utilizing this volumetric expansion force to fragment or destroy the structure. Since the quicklime does not harden upon hydration, quicklime which is merely poured into the bored hole and then hydrated overflows from the mouth of the hole upon hydration and expansion, so that an effective expansive pressure does not act upon the structure, thereby making complete destruction impossible. These previous proposals therefore require means for transferring the expansive pressure to the structure in an effective manner. For example, a metal cap or the like is used to seal the hole to form a rigid cavity in which the quicklime is then hydrated. This allows the resulting volumetric expansion force to act upon the structure with a greater effectiveness.

These previous proposals teach a variety of means for effecting the mechanical seal, but all of them are defective in that they require considerable time to perform the necessary labor. Moveover, since it is necessary to bore a large number of holes in a concrete structure in order to destroy it, the aforesaid conventional methods of destruction are inefficient. For these reasons such methods have not as yet come into common use.

Nevertheless, there is much to be said in favor of the chemical methods of destruction in terms of their social value, namely that they are simple, safe and inexpensive. This is because they utilize low-cost quicklime which need only be mixed with water and then injected into a bored hole to destroy a concrete structure or base rock. The value of such methods would be enhanced even further, however, if it were possible to dispense with the mechanical sealing means.

BRIEF SUMMARY OF THE INVENTION

The object of the present invention is to provide a material for destroying concrete structures, base rock and the like, which material satisfies the aforementioned requirement, namely that a structure be destroyed without mechanical sealing means.

Said material, which will be referred to as the "destructive material" hereinafter, should exhibit the following three properties, related to hydration, to be used in the destructive method of the type described:

(1) The initiation of the hydration reaction should take place after a predetermined time period. That is, after the addition of water, the reaction should not set in until the injection of the mixture into the hole has been completed.

(2) The completely injected destructive material should expand upon hydration without overflowing from the hole, so that the expensive pressure may act upon the structure in effective fashion.

(3) The material should exhibit enough expansive pressure to destroy or fragment the structure in a comparatively short period of time.

The inventor has carried out research with regard to quicklime, particularly with relation to the rate of hydration of quicklime using various retardants, and methods of endowing quicklime with a self-curing property, and has reached certain conclusions based on a large quantity of experimental results. Specifically, when industrial powdered quicklime is utilized as a constituent of the destructive material, all three of the aforementioned requirements cannot be satisfied under ordinary temperatures even with the addition of various retardants. Under low temperatures of 10° to 15° C. the hydration rate of quicklime declines as a matter of course, but with the exception of this case, the foregoing statement holds true. Thus it is difficult to destroy concrete structures or the like effectively under normal temperatures without relying also upon the aforementioned mechanical sealing means.

The Inventor has conducted further research on methods of endowing inexpensively available industrial quicklime with hydration properties typified by the three properties mentioned hereinabove. As the result of such research the Inventor has perfected the present invention upon discovering that a mixture of cement and quicklime adjusted to a specified range of particle size exhibits both an ideal hydration expansion property and hydration property for use as a material for the destruction of concrete structures and the like.

Specifically, the present invention provides a destructive material characterized in that, following calcination of limestone within a temperature range of from 1200° to 1500° C. to produce quicklime, 20 to 80 parts by weight of coarse-grain quicklime adjusted to a particle size of from 88 to 3000 microns, preferably 500 to 1000 microns, by pulverizing the mass of said quiclime, is mixed with 20 to 80 parts by weight of cement.

The destructive material according to the present invention, merely by being mixed with water and injected into a hole bored in a concrete structure of the like, enables the destruction of said structure without the additional use of any mechanical sealing means whatsoever.

BRIEF DESCRIPTION OF THE DRAWINGS

These and other advantages and features of the present invention will become more apparent in the following description and the accompanying drawings in which.

DESCRIPTION OF THE PREFERRED EMBODIMENTS

Figure 1:
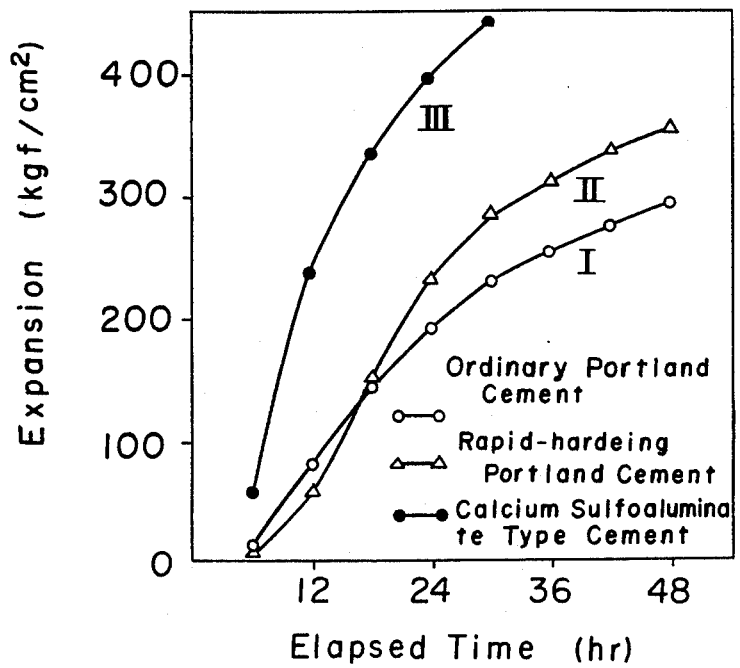
FIG. 1 is a graph of expansion curves for different cements used in embodiments of the present invention.

The hydration mechanism will now be investigated further while referring to the three aforementioned hydration properties that are essential for a destructive material.

One critical hydration property for a destructive material which is the object of the present invention is Item (1) set forth hereinabove, namely that after water has been added to the material, the hydration reaction should not start until the injection of the mixture into the bored hole has been completed.

When quicklime is calcined at the aforementioned temperature range of 1200° to 1500° C., the calcium oxide (CaO) crystals which are formed have a very small particle size of from 1 to 5 microns and a high hydration activity. Such quicklime therefore does not produce a destructive force unless the hole into which it is injected is capped. The quicklime used in the destructive material of the present invention is adjusted to the abovementioned coarse particle size ranging from 88 to 3000 microns, however, so that the area per unit weight of the quicklime that contacts the water is small. When the coarse-grain quicklime contacts the water, therefore, the hydration reaction is initiated gradually starting from the surface of the quicklime, allowing said reaction to be inhibited sufficiently by the gypsum contained in the cement. Thus the time required to inject the inventive destructive material is long enough to delay the hydration reaction sufficiently.

The next hydration property necessary for a destructive material, namely Item (2) mentioned above, is that the completely injected destructive material should expand upon hydration without overflowing from the hole, so that expansive pressure may act upon the structure effectively.

To meet this requirement, the destructive material of the present invention utilizes the coarse-grain quicklime as the expanding ingredient, and employs the cement as the ingredient. When the inventive destructive material is mixed with water, therefore, the coarse-grain quicklime dispersed uniformly in the cement paste, and the cement itself which undergoes a reaction, cooperate to produce a hydration and expansion reaction with gives rise to a favorable expansive pressure within the hardened cement. When the destructive material is injected into a hole bored in a body which is to be destroyed, however, the adhesion of the cement to the wall of the hole is such as to permit the material to expand upon hydration without overflowing, even when the hole is uncapped. The expansive pressure may thus act upon the body effectively to destroy it.

The third necessary hydration property for a destructive material is expansive pressure of a degree sufficient to destroy a structure in a comparatively short time, as mentioned in Item (3) above. To this end, the material of the present invention undergoes an expansion reaction which involves the coarse-grained quiclime dispersed uniformly within the hardened cement, as mentioned above. This makes it possible to realize excellent expansive pressure so that a structure can be destroyed in a short period of time, as will be described hereinbelow in the preferred embodiments.

As set forth above, the use of coarse-grained quicklime of a specified particle size is one characterizing feature of the inventive destructive material comprising a mixture of quicklime and cement. This feature makes it possible to dispense with the hitherto required hole sealing work when practicing a destructive method. It should be noted, however, that while the use of Portland cement as the cement ingredient provides enough force to destroy a concrete structure, it is inadequate for the destruction of rock formations and base rock.

The Inventor has carried out further experimentation and research in this connection and has found that cement which contains rapid-hardening calcium sulfoaluminate $4CaO.3Al_2O_3.SO_3$ as a hydraulic component may be used effectively as the cement ingredient in a material for destroying rock formations and base rock.

When use is made of cement containing calcium sulfoaluminate as a hydraulic component, the hydration expansion reaction occurs with the coarse-grained quicklime dispersed uniformly in a hardening structure which exhibits a rapid-hardining property. The result is great expansive pressure as well as greater adhesion of the cement to the walls of the hole. In consequence, the injected destructive material expands upon hydration without overflowing from the hole and, as will be described in the embodiments, destroys concrete structures in a short period of time and even rock formations, bed rock and the like.

Cement which contains calcium sulfoaluminate as a hydraulic component, however, solidifies owing to the formation of ettringite due to a reaction between the calcium sulfoaluminate and a coexistent CaO or $CaSO_4$ component, and may exhibit both a high strength and rapid hardened property. In such case, the curing reaction attributed to the calcium sulfoaluminate, and the expansion reaction caused by the coarse-grained quicklime, can both be suitably controlled by adding a proper amount of a retardant, consisting of oxycarboxylic acid or salts thereof, at the time of manufacture or at the time of use. In other words, the addition of such a retardant is very effective in enhancing workability in a case where use is made of a cement which exhibits a rapid hardening property and a high strength, and which contains calcium sulfoaluminate. That is, the addition of the retardant will prevent the material from hardening before it is completely injected into the hole following the addition of water.

The following examples are illustrative of the present invention.

EXAMPLE 1

A destructive material according to the present invention, consisting of 50% quicklime which was pulverized to a particle size of from 500 to 1000 microns following calcination at 1300° C., and 50% readily available, ordinary Portland cement or high early strength Portland cement, was mixed with water at a water-solid ratio of 0.3 and injected into a carbon steel pipe 32A having an inner diameter of 35.7 mm and a wall thickness of 3.5 mm, and a change in the strain of the steel pipe with time was measured. FIG. 1 is a graph showing the resulting expansion curves at a temperature of 20° C.

Since the expansive pressure required for the destruction of concrete structures and rock formations is 20 to 80 $kgf/cm^2$ for concrete and 50 to 70 $kgf/cm^2$ for rock formations of limestone, it may be understood that the inventive destructive material comprising coarse-grained quicklime and ordinary Portland cement is capable of destroying concrete and limestone formations within 18 hours of injection, as clearly shown by the curve for ordinary Portland cement in FIG. 1. Furthermore, the mixture of coarse-grained quicklime and high early strength Portland cement exhibits a higher expansive pressure 24 hours after injection than does the abovementioned mixture, as will be appreciated from the curve for the rapid-hardening cement. The reason is considered to be that high early strength Portland cement is superior to ordinary Portland cement in terms of the rate at which its strength develops. It may be presumed that even greater expansive pressures can be developed if use is made of those Portland cements exhibiting an even more pronounced rapid-hardening property. This offers the possibility of rapidly developing expansive pressures of more than 300 kgf/cm$^2$ which are needed to destroy hard rock formations.

For the purpose of comparison a mixture was prepared consisting of 50% powdered quicklime adjusted to a fineness of powder of 2500 cm$^2$/g, and 50% ordinary Portland cement. In order to subject this mixture to the foregoing expansive pressure test, the mixture was blended with water at a water-solid ratio of 0.3 and a temperature of 20° C. Upon doing so, however, the mixture generated heat and expanded suddenly after the introduction of water and blending. Thus it was not possible to satisfy one of the critical requirements of a destructive material, namely that the hydration reaction can be initiated for a certain period of time, specifically not before the completion of the injection operation subsequent to mixing with water.

EXAMPLE 2

In order to destroy a machine foundation made of concrete, the foundation having a volume of approximately 1 m$^3$, holes having a diameter of 36 mm and a depth of 60 to 70 cm, and spaced apart from one another by 20 to 30 cm, were bored in the foundation. A mixture of 50% quicklime, pulverized and adjusted to a particle size of 500 to 1000 microns, and 50% ordinary Portland cement, was blended with water at a water-solid ratio of 0.3 and was then injected into the holes. Cracks formed in the foundation about 20 hours after the injection of the mixture and then widened to complete the destruction of the foundation. The average open air temperature was 21° C.

EXAMPLE 3

A mixing consisting of 50% quicklime which was pulverized to a particle size of from 500 to 1000 microns following calcination at 1300° C., and 50% of a calcium sulfoaluminate-type cement, was blended with water at a water-solid ratio of 0.3 and injected into a carbon steel pipe 32A having an inner diameter of 35.7 mm and a wall thickness of 3.5 mm, and a change in the strain of the steel pipe with time was measured. The resulting expansion curve, at a temperature of 20° C., is as shown in FIG. 1. The calcium sulfoaluminate-type cement which was used contained about 30% calcium sulfoaluminate and exhibited a rapid curing or rapid hardening (early high strength) property. Moreover, 0.2% citric acid was added to the cement composition as a retardant.

The expansive pressure required for the destruction of concrete structures is 20 to 80 kgf/cm$^2$, 50 to 70 kgf/cm$^2$ for the destruction of limestone, and 300 kgf/cm$^2$ for the destruction of hard rock formations, as mentioned hereinabove. It will be obvious from FIG. 1 that a cement mixture according to the present invention, containing coarse-grained quicklime and calcium sulfoaluminate as a hydraulic component, is capable of destroying concrete and limestone 6 to 12 hours after injection, and even hard rock formations within 18 hours of injection. Though the mixture of coarse-grained quicklime and ordinary Portland cement, included in FIG. 1 for the purpose of comparison, is capable of destroying concrete and limestone within 18 hours of injection, 48 hours are required to develop the expansive pressure of 300 kgf/cm$^2$ which is necessary to destroy hard rock formations.

Thus, a destructive material comprising a cement mixture which contains coarse-grained quicklime and calcium sulfoaluminate as a hydraulic component exploits both a hydration expansion property and a hydration property to develop, in short period of time, the expansive pressures necessary for destroying all forms of concrete and rock formations.

EXAMPLE 4

Figure 2:
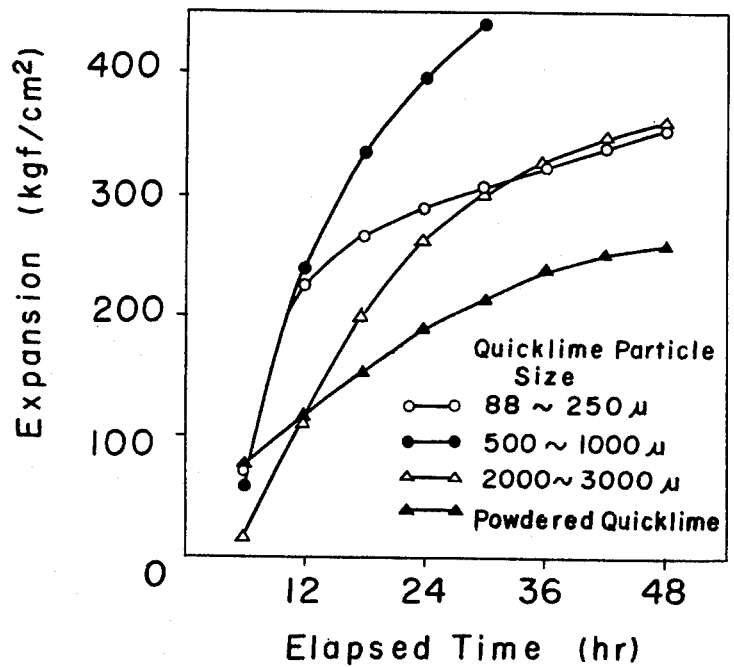
FIG. 2 is a graph of expansion curves for quicklime of different particle sizes.

FIG. 2 is a graph showing expansion curves for mixtures consisting of 50% cement, containing about 30% calcium sulfoaluminate, and 50% quicklime in which, following calcination at 1300° C., the quicklime was pulverized into coarse-grained quicklime with adjusted particle sizes of 88 to 250 microns, 500 to 1000 microns and 2000 to 3000 microns, respectively, and into powdered quicklime with an adjusted powder fineness of 2500 cm$^2$/g. Citric acid (0.2%) was added to each composition as a retardant. An experiment was performed using the method described in Example 1. It may be appreciated from FIG. 2 that, although there are differences depending upon the range of particle sizes, the expansive pressure of 300 kgf/cm$^2$ required to destroy all forms of concrete and rock formations is developed in no longer than 30 hours when the quicklime pulverized to a particle size ranging from 88 to 3000 microns is mixed with cement containing calcium sulfoaluminate as a hydraulic component. The expansive pressure is far superior to that developed by the mixture which includes the powdered quicklime whose powder fineness is 2500 cm$^3$/g, as shown in FIG. 2 for the purpose of comparison.

EXAMPLE 5

In order to fracture a lump of limestone having a volume of 2 m$^3$ and occurring in a limestone mine, holes having a diameter of 36 mm and a depth of 70 to 80 cm, and spaced apart from one another by 30 to 40 cm, were bored in the limestone. A composition in accordance with the present invention, as described in Example 3, was blended with water at a water-solid ratio of 0.3 and was then injected into the holes. Cracks formed about 10 hours after the injection of the mixture and then widened to complete the destruction of the lump 14 hours after injection. The average open air temperature was 21° C.

Thus a destructive material having a composition in accordance with the present invention as described hereinabove exhibits an excellent destructive capability and will find wide use in the demolition of concrete structures and in the destruction of rock formations.

What we claim is:

1. A destructive material comprising a mixture of 20 to 80 parts by weight of coarse-grained quicklime adjusted to a particle size of from 88 to 3000 microns by pulverizing a quicklime mass having a crystal size of 1–5 microns, said quicklime mass being obtained by calcination of limestone at a temperature of from 1200° to 1500° C., and 20 to 80 parts by weight of cement.

2. A destructive material according to claim 1, comprising a mixture of 20 to 80 parts by weight of coarse-grained quicklime adjusted to a particle size of from 88 to 3000 microns by pulverizing a quicklime mass obtained by calcining limestone at a temperature of from 1200° to 1500° C., and 20 to 80 parts by weight of cement containing an effective amount of calcium sulfoaluminate as a hydraulic component.

3. A destructive material according to claim 1, comprising a mixture of 20 to 80 parts by weight of coarse-grained quicklime adjusted to a particle size of from 88 to 3000 microns by pulverizing a quicklime mass obtained by calcining limestone at a temperature of from 1200° to 1500° C., 20 to 80 parts by weight of rapid-hardening cement containing an effective amount of calcium sulfoaluminate as a hydraulic component, and a suitable amount of a retardant for retarding the hydration of said calcium sulfoaluminate.

4. The destructive material according to claim 1, wherein said destructive material contains particles of quicklime having a particle size of from 500 to 1000 microns.

5. The destructive material according to claim 2, wherein said destructive material contains particles of quicklime having a particle size of from 500 to 1000 microns.

6. A destructive material consisting essentially of a mixture of 20 to 80 parts by weight of coarse-grained quicklime adjusted to a particle size of from 88 to 3000 microns by pulverizing a quicklime mass having a crystal size of 1-5 microns, said quicklime mass being obtained by calcination of limestone at a temperature of from 1200° to 1500° C., and 20 to 80 parts by weight of cement.

7. A destructive material according to claim 1, consisting essentially of a mixture of 20 to 80 parts by weight of coarse-grained quicklime adjusted to a particle size of from 88 to 3000 microns by pulverizing a quicklime mass obtained by calcining limestone at a temperature of from 1200° to 1500° C., and 20 to 80 parts by weight of cement containing an effective amount of calcium sulfoaluminate as a hydraulic component.

8. A destructive material according to claim 1, consisting essentially of a mixture of 20 to 80 parts by weight of coarse-grained quicklime adjusted to a particle size of from 88 to 3000 microns by pulverizing a quicklime mass obtained by calcining limestone at a temperature of from 1200° to 1500° C., 20 to 80 parts by weight of rapid-hardening cement containing an effective amount of calcium sulfoaluminate as a hydraulic component, and a suitable amount of a retardant for retarding the hydration of said calcium sulfoaluminate.

9. The destructive material according to claim 6, wherein said destructive material contains particles of quicklime having a particle size of from 500 to 1000 microns.

10. The destructive material according to claim 7, wherein said destructive material contains particles of quicklime having a particle size of from 500 to 1000 microns.

11. The destructive material according to claim 8, wherein said destructive material contains particles of quicklime having a particle size of from 500 to 1000 microns.

12. The destructive material according to claim 1, wherein said destructive material is capable of developing expansive pressures of 300 kgf/cm$^2$ in no longer than 30 hours after mixing with water.

13. The destructive material according to claim 2, wherein said destructive material is capable of developing expansive pressures of 300 kgf/cm$^2$ in within 18 hours of injection.

14. The destructive material according to claim 6, wherein said cement is a calcium sulfoaluminate-type cement containing about 30% calcium sulfoaluminate.

* * * * *